Feb. 12, 1935.  H. J. KLINE  1,991,159
BRAKE CLEARANCE ADJUSTER
Filed Jan. 27, 1933
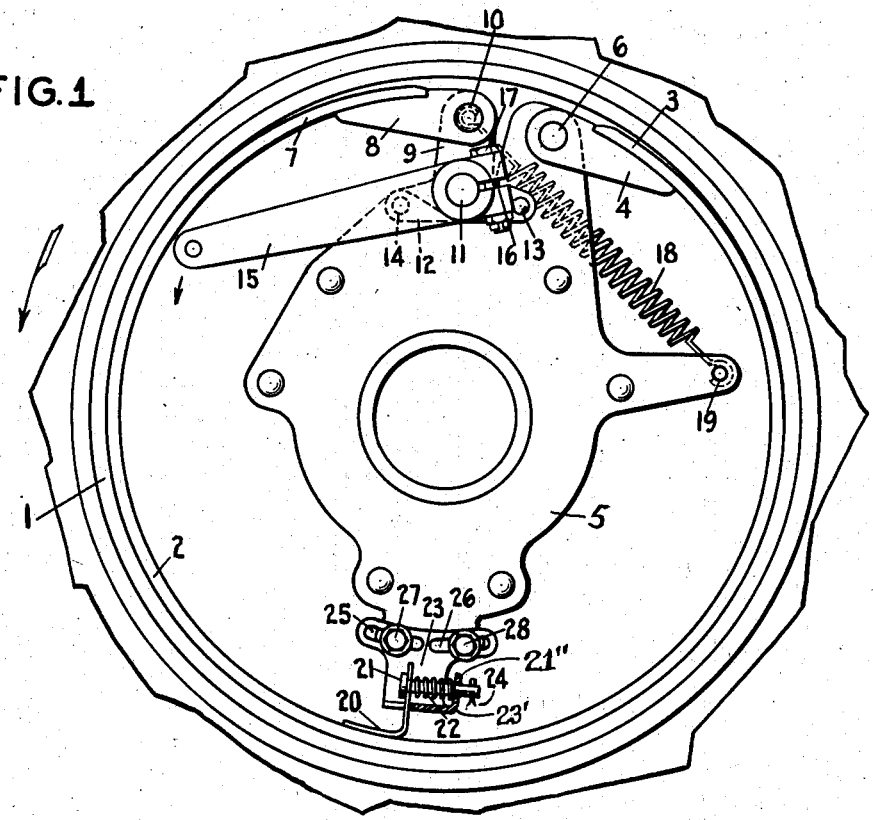
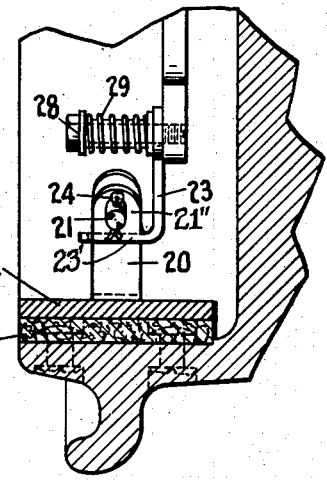
Inventor
Herbert J. Kline
By his Attorney Isa J. Adams Patented Feb. 12, 1935

1,991,159

UNITED STATES PATENT OFFICE 1,991,159

BRAKE CLEARANCE ADJUSTER

Herbert Joseph Kline, Jackson, Mich., assignor to Automotive Fan & Bearing Co., a corporation of Michigan Application January 27, 1933, Serial No. 653,772

3 Claims. (Cl. 188—79.5)

This invention relates to brakes for various devices such as airplane and automobiles.

One object of the invention is to construct a brake band with a shiftable support.

Another object is to construct a brake of the band type with a support that automatically shifts as the lining wears.

Other objects will appear in the appended description reference being had to the drawing in which:

Fig. 1 is a view of a brake and the associated friction lining, in the applied braking position, the support being shown partly in section.

Fig. 2 is a sectional view of a portion of the brake drum showing the shiftable support.

Fig. 3 is a plan view of the adjustable stop shown in Fig. 1.

In Fig. 1 the friction lining 1 is attached to the rotating brake drum. The brake band 2 has its end 3 riveted or welded to two identically shaped ears 4, which are pivoted by stud 6 to the anchor plate 5. The other end 7 of the band 2 is chamfered or bent inwardly through a portion of the arc and is riveted to identically shaped ears 8. The end 3 may also be thus chamfered or bent inwardly as shown.

These ears are pivoted to the arm 9 by stud 10 fastened to the stub shaft 11. The shaft 11 is journalled in the anchor plate in any manner but I have shown it journalled in a bushing 12 riveted or otherwise fastened to the anchor plate at 13, 14.

An arm 15 is clamped to the end of the stub shaft 11 by means of the split clamp-end 16 and tightening bolt 17. The brake cable or rod (not shown) will be fastened to the free end of lever arm 15.

A spring 18 is fastened at one end to the anchor plate at 19 and at the other end to the stud 10 or other part of the brake band. This spring normally holds the brake band in released position.

An angle strap 20 welded or otherwise fastened to the band 2 in an intermediate position extends through an open ended slot 21' in an outwardly turned end 23' of a friction plate 23 secured to the anchor plate 5. A headed pin 21 extends through the strap 20 and an ear or stop 21'' substantially at a right angle to the end 23'. A compression spring 22 surrounds the pin 21 and forces the strap 20 and brake band 2 to the left in Figs. 1 and 2 until the cotter pin 24 engages the stop 21''. The plate 23 has two slots 25, 26 through which studs 27, 28 extend. The studs are screwed into the anchor plate as shown.

Surrounding the pin and bearing against the head of bolt 28 and plate 23 is a compression spring 29.

The operation of the brake is as follows: A pull downwards (in Fig. 1) on the arm 15 forces the end 7 of the brake band to the position shown. In this movement the end 7 is moved not only circumferentially but also radially outward by the rotating arm 9. The flexibility of the band permits this. First application of the brake brings a major portion of the band into contact with the friction lining as shown in Fig. 1. Further pressure forces the end 7 still more radially outward thus bringing more of the surface of the band into contact with the friction lining on the drum. This still further increases the braking action.

To release the brake pressure, pull on the arm 15 is relieved and the spring 18 moves the end 7 of the band away from the lining. The spring 22 cooperates in this movement and forces the strap 20, attached to the band, to the left until the cotter pin 24 engages the stop 21''.

As the brake band 2 and lining 1 wear away the band will be forced further and further in a counter clockwise direction to apply the brake. Spring 22 will compress and expand to permit the small movement of the band in the braking operations but after a predetermined amount of wear the spring can yield no further. Additional wear of the band will cause the brake-setting movement to positively shift the plate 23 on the anchor plate 5 by causing the strap 20 to compress spring 22 until such strap engages the end of slot 21'. Further application of the brake thus causes the strap 20 to slide the plate 23 on the anchor. On release of the brake the plate 23 will remain in the shifted position but the spring 22 will shift the angle plate 20 and band 2 back to a new released position. The friction of the plate 23 against the anchor plate 5 is always greater than the spring 22 can overcome. This friction can be overcome only by the force of the brake band when the strap 20 engages the stop formed by the end of the slot 21'.

In this way the spring 22 shifts the band 2 between the two stops constituted by the cotter pin 24 or ear 21'' and the end of slot 21' from applied to released position without movement of the plate 23 till wear causes the angle 20 to engage the end of slot 21' before the band has traveled to full braking position after which further movement of the band 2 and angle 20 moves the plate 23 to a new position. The plate 23 thus moves only at intervals as the lining and band wear away but when once shifted it holds the shifted position. This has proven to be an effective way to control the movements of the band and eliminates all adjustments for wear except in the rod or cable connection fastened to the arm 15. This is a marked advantage as the usual hand adjustment of the brake band to reduce clearance, after predetermined wear, requires skilled mechanics and repeated tests to obtain correct clearance. In my improvement an unskilled attendant can make the adjustment. It is necessary only to lengthen the brake rod or cable to bring the brake pedal back to normal position.

While I have shown the centering device as applied to a particular type of brake this has been by way of example only. It may be used on various other types of brakes.

Having described my invention what I claim is:

1. In brakes, a brake band, strap on said band, a brake anchor, a plate slidably attached to said anchor, means to produce a frictional force against movement of the plate on the anchor, a pin extending through said strap and plate with stops at each end to permit limited sliding movement therebetween and a spring on said pin tending to separate the strap and plate.

2. In brakes, an anchor plate, a brake band, a bracket on said anchor plate having an ear and a slot, a stud passing through said slot and threaded into the anchor plate, a spring on said stud producing a frictional force to resist movement of the bracket on the anchor plate, a strap on said band, a pin passing through said strap and ear and a spring on said pin to maintain the strap at one end of said pin.

3. In brakes, a brake drum, an anchor plate, a friction member adapted to engage said drum and attached at one end to said plate, operating means attached to the other end of said friction member, a take-up member attached to said anchor plate to move substantially parallel to the surface of said braking drum, said take-up member having two spaced stops, means attached to said friction member adapted to move between said stops and a spring engaging said means to hold it against one of said stops and means to hold said take-up device in position on the anchor plate with greater force than can be exerted by said spring.

HERBERT JOSEPH KLINE.